May 29, 1934.   R. J. FINCH ET AL   1,960,306

LOCOMOTIVE

Filed Oct. 9, 1931    7 Sheets-Sheet 2

INVENTORS
Raymond J. Finch
Edwin W. Albers
BY
S. C. Heaton
ATTORNEY May 29, 1934.  R. J. FINCH ET AL  1,960,306
LOCOMOTIVE
Filed Oct. 9, 1931  7 Sheets-Sheet 3

INVENTORS
Raymond J. Finch
Edwin W. Albers
BY
S. C. Yeaton
ATTORNEY

May 29, 1934.    R. J. FINCH ET AL    1,960,306
LOCOMOTIVE
Filed Oct. 9, 1931    7 Sheets-Sheet 4

INVENTORS
Raymond J. Finch
Edwin W. Albers
BY S. C. Yeaton
ATTORNEY

May 29, 1934.  R. J. FINCH ET AL  1,960,306
LOCOMOTIVE
Filed Oct. 9, 1931  7 Sheets-Sheet 6

INVENTORS
Raymond J. Finch
Edwin W. Albers
BY
S.C. Yeaton
ATTORNEY

Patented May 29, 1934

1,960,306

UNITED STATES PATENT OFFICE 1,960,306

LOCOMOTIVE

Raymond J. Finch and Edwin W. Albers, Schenectady, N. Y.

Application October 9, 1931, Serial No. 567,784

21 Claims. (Cl. 105—48)

This invention relates to locomotives, and particularly to appliances for locomotives known as traction increasers.

In locomotive practice the tractive power is limited by the weight on the drive wheels and the weight on the drive wheels is limited by the carrying capacity of the rails, road-bed, and road structures. When a locomotive is moving, the blow from the counter-balance, hereinafter referred to as the dynamic augment, increases with the square of the speed, and a maximum total effect on the rails results when the locomotive is operating at a maximum speed, this effect being equal to the static weight of the locomotive transmitted by the drive wheels plus the dynamic augment. During the starting period of the locomotive and when it is travelling at a low speed and the dynamic augment is therefore low, appreciable additional static weight may be applied to and transmitted through the drive wheels with a resultant total effect upon the rails by the drive wheels which may be less than the resultant total effect thereby when the locomotive is operating with its normal static weight on the drive wheels, at high speeds.

Frequently locomotives of both long and short cut-off are over-cylindered, which results in slipping of the drive wheels during the starting period by reason of lack of sufficient adhesive weight.

In locomotives which are built to operate at short cut-off, although such cut-off tends toward an efficient locomotive, the starting power is less than that of a long cut-off lomocotive, so that frequently auxiliary starting ports and other similar devices are applied to the valves, whereby the period of steam admission is lengthened beyond the maximum permitted by the main valve gear during the starting period and the tractive power thereby proportionately increased. Ordinarily, however, such locomotives have a factor of adhesion which is sufficient only for the power obtained at their regular short cut-off operation. Consequently when the auxiliary starting devices are used and the period of steam admission is lengthened to increase the starting power, these locomotives also are very slippery.

An object of the present invention is to provide a means for increasing the adhesive weight on the drivers during the starting period, which means will operate to reduce this adhesive weight when the tractive power is sufficiently reduced to allow an ample factor of adhesion with the normal weight on the drivers.

More particularly this invention provides means for increasing the adhesive weight on the drive wheels of the locomotive when the locomotive is operating at a relatively long period of steam admission, and for automatically reducing the adhesive weight when the period is shortened for normal operation.

A further object of the invention is to provide a modified adjustable equalizer mechanism, without power controlled adjusting mechanism, for effecting a variance in the distribution of the weight of a locomotive between its drive wheels and truck wheels, which equalizer mechanism will be applicable to an ordinary locomotive.

Other and further objects which are attained and advantages which are achieved by the instant invention will be apparent from the detailed description of the embodiments of the invention which are hereinafter set forth.

The invention is illustrated in the accompanying drawings, in which.

Figure 1:
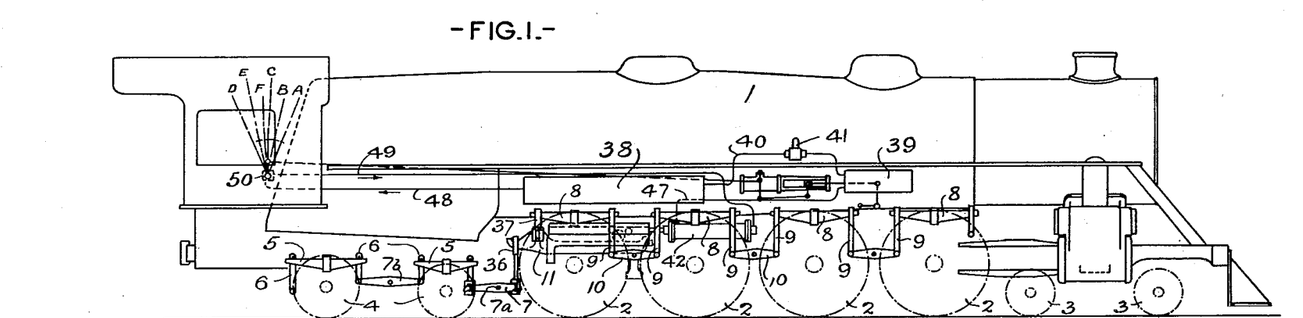
Fig. 1 is a side elevation of a locomotive showing the invention applied thereto.
Figure 2:
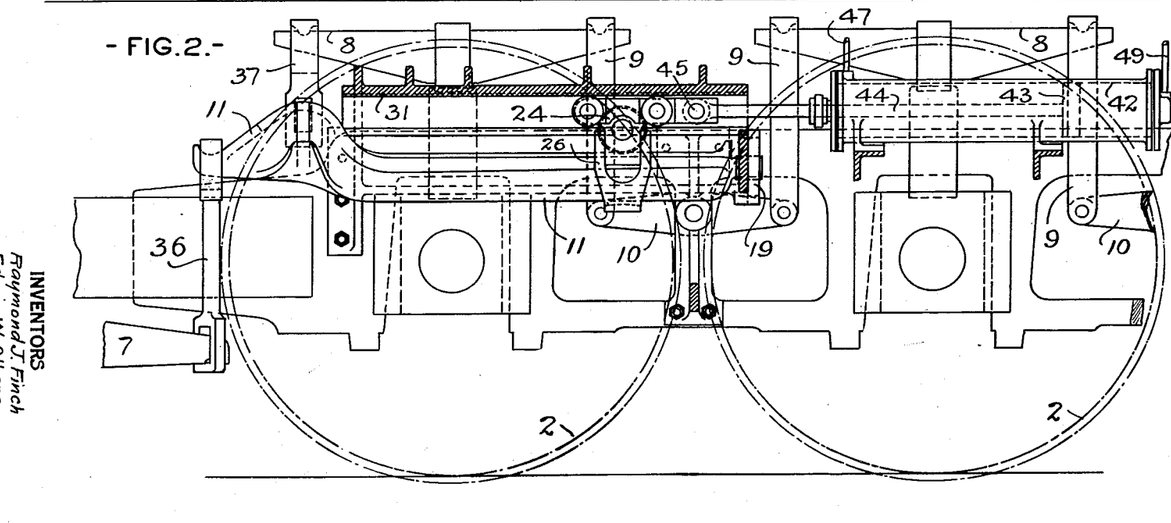
Fig. 2, an enlarged sectional view of the portion of the locomotive embodying the main equalizer lever and its fulcrum adjusting mechanism on the line II—II of Fig. 3, certain parts being omitted, and the drive wheels being shown only in outline.

Referring in detail to the drawings, and first particularly to Figs. 1 and 2, a locomotive, indicated generally by the numeral 1, is provided with four pairs of driving wheels 2, a leading truck having two pairs of wheels 3, and a trailing truck having two pairs of wheels 4, to all of which wheels the weight of the locomotive is distributed. The trailing truck is provided with sets of spring rigging on the opposite sides thereof, which sets include leaf springs 5, links 6, and equalizer levers 7 and 7b, and the drive wheels are similarly provided with sets of spring rigging on the opposite sides of the locomotive which comprise leaf springs 8, links 9, and equalizer levers 10 (only one side of the locomotive being shown in these figures).

The sets of spring rigging of the trailing truck and the sets of spring rigging of the driving wheels are connected by a main equalizer lever 11 (Figs. 1, 2, 10, 11 and 12). The equalizer lever 11 comprises an integral casting having a straight longitudinal portion 12, T-shaped in cross section. The rear end of the longitudinal portion of the equalizer lever 11 diverges into arms 13 and lateral extensions 14. The extensions 14 are re-enforced by ribs 15, and a top wall 16 is provided, connecting the arms 13 to give ample strength at the point of maximum bending moment. The upper side of the longitudinal portion of the equalizer lever is provided with a tongue 17 over which is fitted a wearing plate 18 of hardened steel. The plate 18 is provided with a groove which engages the tongue, and the plate is welded in place on the equalizer lever. The plate extends substantially the entire length of the longitudinal portion 12, and provides a wearing surface to accommodate a fulcrum member in the form of a roller 23 (Figs. 7, 8 and 9) hereinafter more fully described. A guide member 19, comprising an integral crosstie casting, is bolted to the frame of the locomotive and is provided with a vertical slot 19a into which the forward end of the equalizer extends. The forward end of the equalizer is provided with a trunnion 20 having a hardened steel bushing 21 disposed thereon and held in place by a pin 22 passed therethrough and the said end is adapted to move vertically within the slot 19a.

Figure 5:
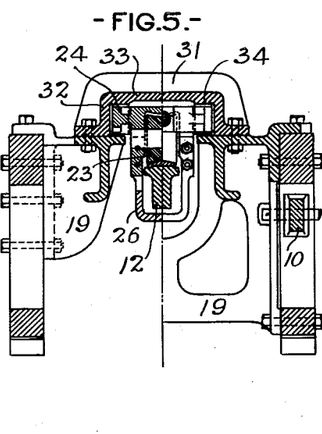
Fig. 5, a section, taken on the line V—V of Fig. 3, looking rearwardly.
Figure 6:
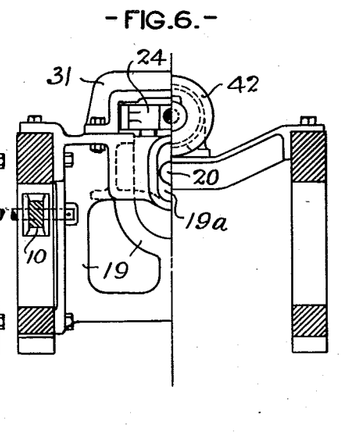
Fig. 6, at the left side, a section taken on the line VI—VI of Fig. 3, and at the right side, a front view, partly in section, of half the portion shown in Fig. 3.
Figure 7:
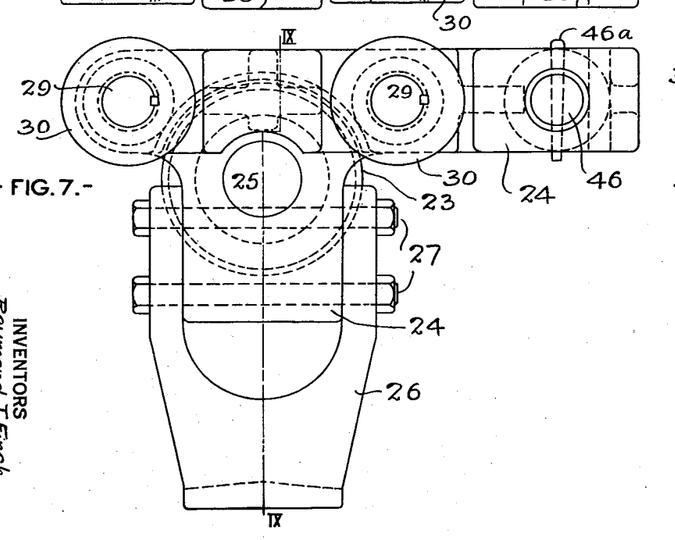
Fig. 7, an enlarged side elevation of the fulcrum roller carrier.
Figure 8:
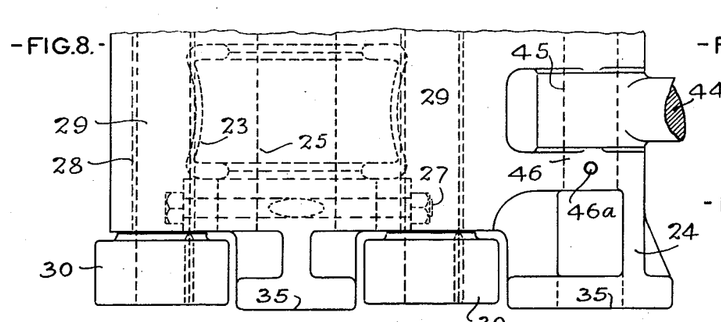
Fig. 8, a fragmental plan view of the portion shown in Fig. 7.
Figure 9:
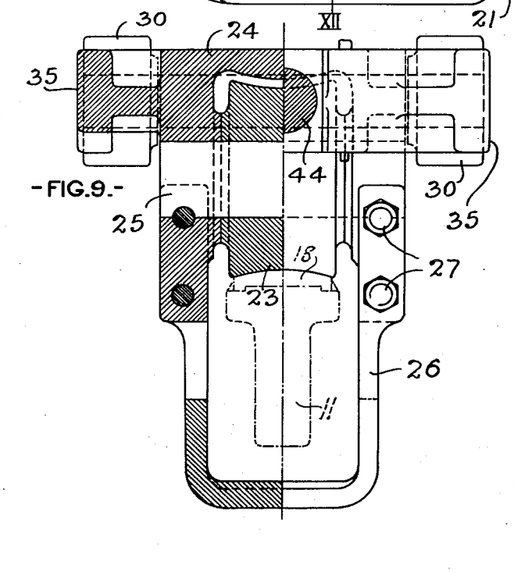
Fig. 9, on the right side, a front view of half the portion shown in Fig. 7, and on the left side, a section taken on the line IX—IX of half the portion shown in Fig. 7.
Figures 10, 11, 12:
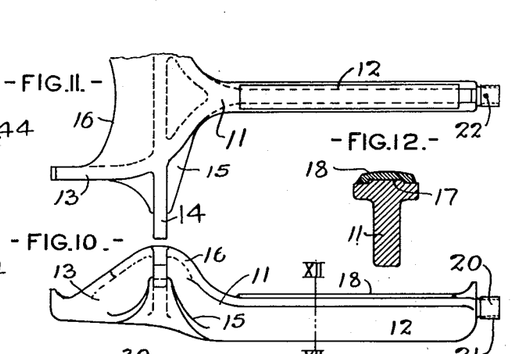
Fig. 10, a side view of the main equalizer lever.
Fig. 11, a fragmental plan view of the lever shown in Fig. 10.
Fig. 12, an enlarged section taken on the line XII—XII of Fig. 10.
Figure 13:
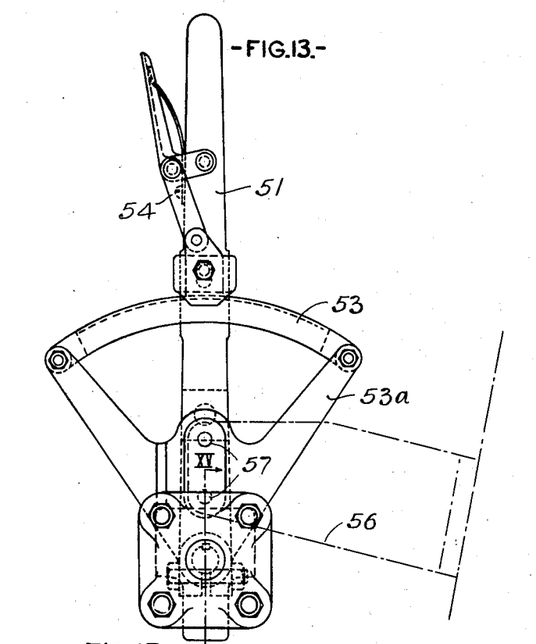
Fig. 13, a side view of the reverse lever and operating valve mechanism.
Figure 14:
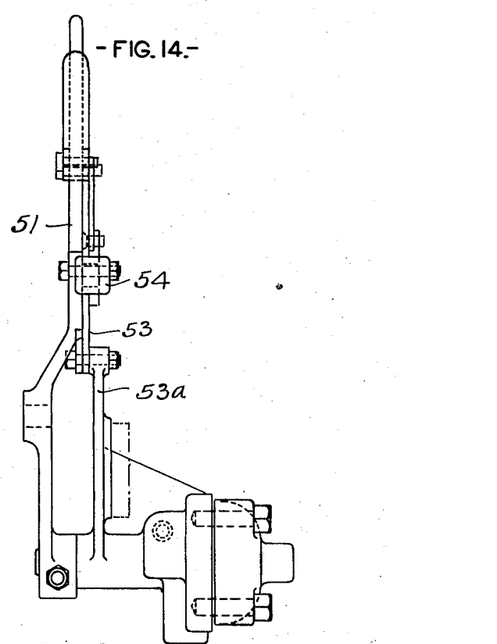
Fig. 14, a back view of the parts shown in Fig. 13.

The fulcrum roller 23 is adapted to move along the wearing plate 18 of the straight longitudinal portion of the equalizer lever. The top surface of the wearing plate is slightly convex in shape and the bearing surface of the roller 23 is slightly concave in conformity therewith to permit a slight rolling movement of the equalizer lever. The roller is held in position by a carrier (Figs. 7 to 9) comprising an integrally cast rectangular housing 24, through the opposite sides of which a pin 25 is passed, providing an axle for the roller 23. A yoke 26, substantially U-shaped in cross section, is suitably attached by bolts 27 to the housing 24, the yoke extending downward and loosely surrounding the longitudinal portion of the equalizer lever 11. The housing 24 is provided with bushings 28 through which shafts 29 are disposed and are adapted to rotate. The shafts carry rollers 30 on their opposite ends. A longitudinal guide member 31 (Figs. 3, 5 and 6) is bolted to the cross tie casting 19 above the longitudinal portion of the equalizer. The guide member 31 is provided with side walls 32 and a transverse top wall 33. On the under side of the top wall are projected oppositely disposed bearing surfaces 34 for the rollers 30. The housing 24 is provided with shoes 35 integrally formed on its opposite sides between and in front of the rollers 30. The shoes 35 extend slightly further outward than the rollers and serve as guides for the carrier between the side walls 32 of the guide member 31.

Figure 3:
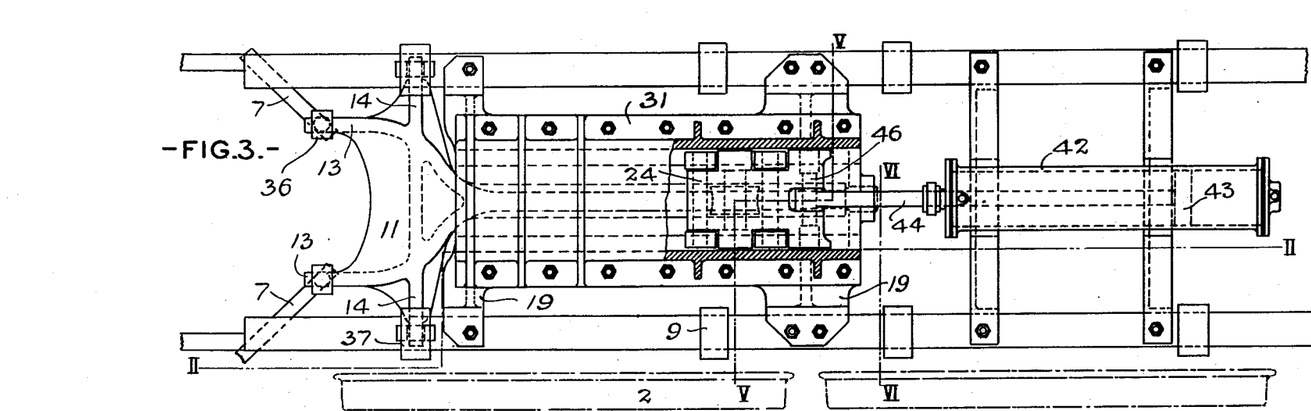
Fig. 3, a plan view of the portion shown in Fig. 2, partly in section.
Figure 4:
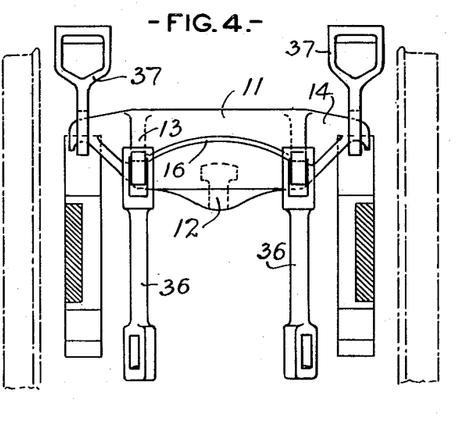
Fig. 4, a rear view, partly in section, of the portion shown in Fig. 2.

The forwardmost equalizer levers 7 of the trailing truck spring riggings are inwardly slanted forwardly and are connected at their forward ends to adjacent arms 13 of the equalizer lever 11 by links 36, and the rear ends of the rearmost leaf springs 8 of the drive wheel spring riggings are connected to the adjacent extensions 14 by links 37 (Figs. 3 and 4).

A high pressure air reservoir 38 and a low pressure air reservoir 39 are disposed on a side of the locomotive and suitably secured thereto, the high pressure reservoir being supplied with air from a pump or other suitable source (not shown). A pipe 40 connects the high pressure and low pressure reservoirs, and a governor valve 41, of usual type, is interposed in the pipe so that air at a reduced pressure is supplied to the low pressure reservoir from said high pressure reservoir (Fig. 1). In practice the pressure of the air in the high pressure reservoir will be approximately 110 pounds, while the pressure in the low pressure reservoir will be approximately 50 pounds.

Forwardly of the equalizer lever 11 a cylinder 42 is disposed and is suitably secured to crossties bolted to the side frames of the locomotive, as clearly shown in Fig. 3. The cylinder is provided with a piston 43 and a piston rod 44. A pin hole 45 (Fig. 8) is formed on the end of the piston rod and the same is pivotally connected to the carrier housing 24 by a pin 46, which passes through said pin hole and is held in the housing casting by a pin 46a being passed through said pin 46 and casting. The rear end of the cylinder 42 is connected by a pipe 47 to the low pressure reservoir 39, from which it receives a constant supply of air under pressure, and the forward end of the cylinder is adapted for connection by pipes 48 and 49 to the high pressure reservoir 38, the pipes 48 and 49 being connected to a control valve mechanism 50.

The control valve mechanism 50 is operably connected to a reverse lever 51, to which lever a valve stem 52 is rigidly connected. The lever 51 is provided with a quadrant 53 having a supporting bracket 53a, and a latch indicated generally by the numeral 54, of the usual type, is connected to the lever so that the lever may be held in a fixed adjusted position, when desired, on the quadrant. A valve body 55 is integrally formed with the bracket 53a, and a bracket 56 supports the valve body and quadrant on the back head of the locomotive boiler, the bracket 56 being suitably secured to the back head, and being connected to the bracket 53a by bolts 57.

Figures 15, 16, 17, 18, 19:
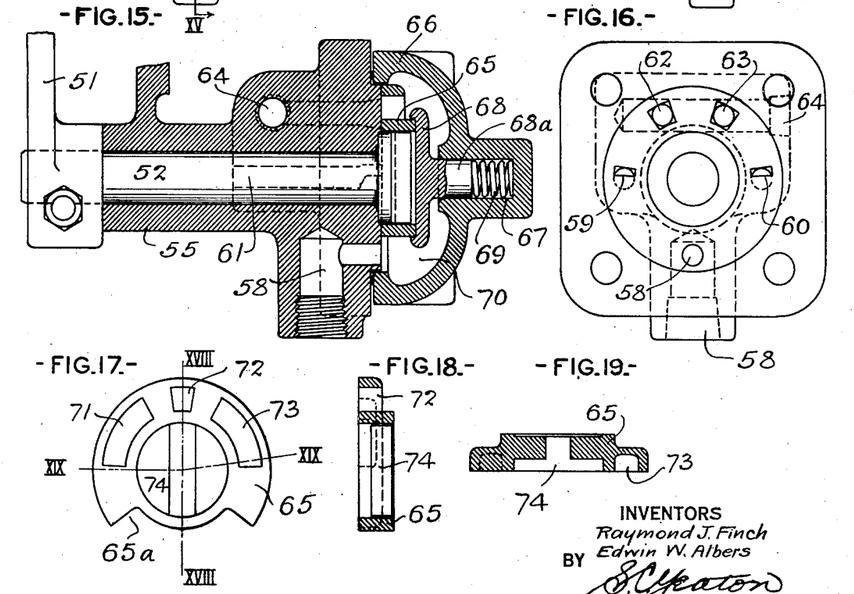
Fig. 15, an enlarged section taken on the line XV—XV of Fig. 13.
Fig. 16, a side view of Fig. 15, with the valve chest and valve member removed.
Fig. 17, a face view of the valve member.
Fig. 18, a section taken on the line XVIII—XVIII of Fig. 17.
Fig. 19, a section taken on the line XIX—XIX of Fig. 17.

The valve body and its seat (Figs. 15 and 16) are provided with an inlet port 58, which is connected to the pipe 48 leading from the high pressure reservoir 38, a pair of exhaust ports 59 and 60 leading through ducts 61 (only one being shown) to the atmosphere, and a pair of outlet ports 62 and 63 leading through a common duct 64, to the pipe 49 and thence to the forward end of the cylinder 42. A valve element 65 is connected to the stem 52, and a chest 66 is disposed over the end of the valve seat covering the valve element 65. The chest 66 is provided with a central recess 67, and the valve element 65 is provided with a cap 68 having a boss 68a integrally formed on the center of the same, which boss extends into the recess 67. A helical spring 69 is disposed in recess 67 and bears upon the end thereof and against the boss 68a, acting to press the valve element against its seat at all times. The chest 66 provides a chamber 70 between its inner face and the seat of the valve, into which chamber the inlet port 58 opens.

The valve element 65 (Figs. 17, 18 and 19) comprises a substantially circular disc which is cut away on one of its sides at 65a. Cavities 71 and 73 are formed in the face of the valve element 65, and an aperture 72 is formed between the said cavities. The central portion of the valve element 65 is provided with an inverted T-shaped recess 74 into which the valve stem 52 extends, the stem being correspondingly shaped to the recess 74 at its outer end and thereby operatively engaging the valve element.

In Fig. 1 are indicated at A, B, C, D, E and F six separate positions of the reverse lever, and the corresponding positions of the valve element with relation to the valve seat when the reverse lever is in these positions, are illustrated in Figs. 20, 22, 24, 26, 28 and 30, respectively, as aforesaid. Figs. 21, 23, 25, 27, 29 and 31 respectively are developed sectional views of the valve elements and seats as shown in the aforementioned series of figures, the lines on which the sections are taken being laid out straight so that the rotation of the valve is represented in the sectional views as moving to the right or left over the valve seat.

Figure 20:
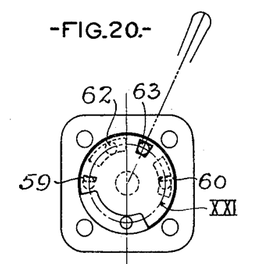
Fig. 20, a side view of the valve member and seat shown in Fig. 13, when in long cut-off forward running position.
Figure 21:
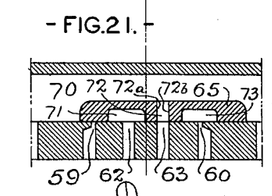
Fig. 21, a section taken on the line XXI of Fig. 20, that is to say the line on which the ports are arranged, which is developed on a straight line.

Figs. 20 and 21 illustrate the relative positions of the valve element and seat when the reverse lever is in position A, for forward motion in long cut-off at approximately 90%, or forward starting position. The chamber 70 is at all times supplied with high pressure air from the main reservoir. The edges 72a and 72b of the port 72, when the valve element is in this position, are in line with the edges of the outlet port 63, allowing the high pressure air to pass through the duct 64 into the pipe 49 and thence to the forward end of the cylinder 42. The exhaust port 59 is closed by the solid portion of the valve member, and the exhaust port 60 is in communication with the cavity 73 and closed thereby. In this position therefore the piston 43 in the cylinder 42 will be moved by the high pressure air outwardly to the rear end of the cylinder 42 and the carrier and its fulcrum roller 23 will be moved to the rear end of the straight portion 12 of the equalizer lever 11, with a resultant change in the distribution of the weight on the wheels of the locomotive, as hereinafter more fully explained.

Figure 22:
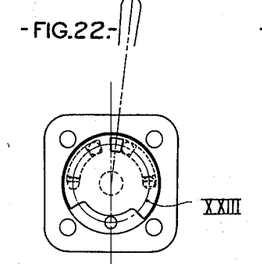
Fig. 22, a view of the valve and seat just previous to changing from long cut-off to short cut-off forward positions.
Figure 23:
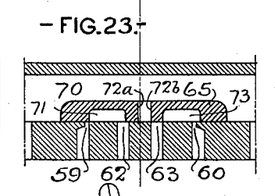
Fig. 23, a view similar to Fig. 21, taken on the line XXIII of Fig. 22.

Figs. 22 and 23 illustrate the relative positions of the valve element and valve seat when the reverse lever is in position B, for forward motion at approximately 55% cut-off. Here the edges 72a and 72b of the port 72 of the valve element are both to the left of the port 63 of the valve seat thereby cutting off communication of the cylinder from the high pressure air supply reservoir. The exhaust ports 59 and 60 however are still in positions similar to their positions for reverse lever position A, so that there is no exhaust permitted from the cylinder, and the piston is held in its extreme rear position, with the fulcrum roller maintained in the same position as described with respect to reverse lever position A. The distribution of the weight of the locomotive on the wheels thereof is likewise still the same as described with reference to the said position A.

Figure 24:
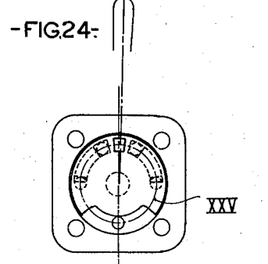
Fig. 24, a view of the valve and seat when in short cut-off forward running position.
Figure 25:
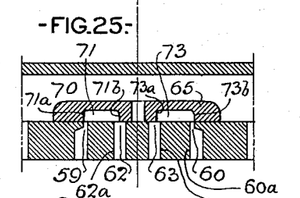
Fig. 25, a view, similar to Fig. 21, taken on the line XXV of Fig. 24.

Figs. 24 and 25 illustrate the relative positions of the valve element and the valve seat when the reverse lever is in position C for forward short cut-off at approximately 12½%. Here the edges of the port 72 in the valve member are both disposed between the ports 62 and 63 of the valve seat, thereby cutting off the supply of high pressure air from the reservoir. In this instance however the edge 71a of the cavity 71 extends over the exhaust port 59, and the edge 71b of the cavity 71 extends over the edge 62a of the outlet port 62, while the edge 73a of the cavity 73 extends over the edge 63b of the outlet port 63, and the edge 73b extends over the exhaust port 60. It will thus be apparent that in this position the exhaust ports being open to the atmosphere through their ducts 61, will effect an exhaust of the high pressure air from the forward end of the cylinder 42, the air passing through the pipe 49, the duct 64, the outlet ports 62 and 63, the cavities 71 and 73, the exhaust ports 59 and 60, and through their said ducts 61 to the atmosphere. By reason of the constant supply of low pressure air to the rear end of the cylinder 42, the piston 43 has thus been carried to the forward end of said cylinder and the carrier with its fulcrum roller 23 has been moved to the extreme forward end of the lever 11, thereby having effected a change in the distribution of the weight on the wheels of the locomotive as hereinafter more fully described.

Figure 26:
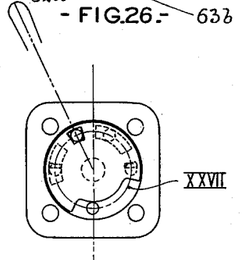
Fig. 26, a view showing the valve in long cut-off reverse running position.
Figure 27:
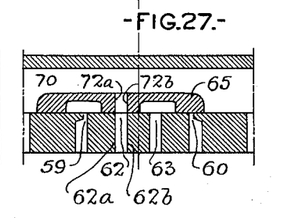
Fig. 27, a section similar to Fig. 21, taken on the line XXVII of Fig. 26.

Figs. 26 and 27 illustrate the relative positions of the valve element and valve seat when the reverse lever is in position D for long cut-off, reverse movement position at approximately 90%, or reverse starting position. This valve position is similar to that described with reference to reverse lever position A, except that here the edges 72a and 72b of the port 72 in the valve element 65 are in line with the edges 62a and 62b of the port 62 of the valve seat thereby effecting the transmission of high pressure air from the main reservoir to the forward end of the cylinder, the air passing through the pipe 48, the inlet port 58, the chamber 70, the valve port 72, the valve seat port 62, the duct 64, and through the pipe 49 to said forward end of the cylinder 42. The piston 43 and the carrier and fulcrum roller are rearwardly moved to the rear end of the straight portion 12 of the lever 11 in the same manner as described with reference to reverse lever position A, and the same distribution of weight on the wheels of the locomotive is effected.

Figure 28:
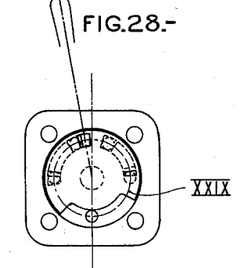
Fig. 28, a view showing the valve just previous to changing from long cut-off to short cut-off positions for reverse running.
Figure 29:
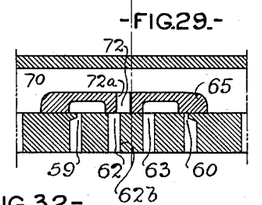
Fig. 29, a section, similar to Fig. 21, taken on the line XXIX of Fig. 28.

Figs. 28 and 29 illustrate the relative positions of the valve element and valve seat when the reverse lever is in position E for reverse running at long cut-off at approximately 65%. In this instance the relative positions of the valve element and the seat are similar to those described with reference to reverse position D, except that here the valve element has been turned slightly on its seat, the exhaust ports 59 and 60 are still closed by the valve element, and although the valve has been turned, the edge 72a of the port 72 is still over the edge 62b of the port 62 and high pressure air still passes through the valve and is similarly supplied from the high pressure reservoir to the forward end of the cylinder, as described in reference to said position D. The fulcrum roller 23 is held in the same rearward position and the same distribution of weight on the wheels of the locomotive is effected.

Figure 30:
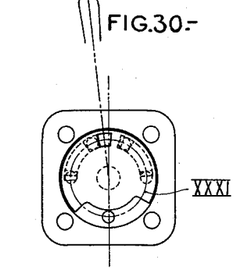
Fig. 30, a view of the valve and seat when in short cut-off reverse running position.
Figure 31:
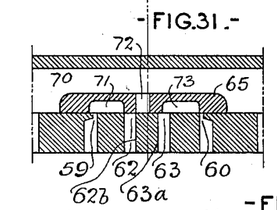
Fig. 31, a section, similar to Fig. 21, taken on the line XXXI of Fig. 30.

Figs. 30 and 31 illustrate the relative positions of the valve element and valve seat for reverse lever position F, for reverse movement at long cut-off at approximately 55%. This valve position is similar to the one illustrated with reference to reverse lever position B except that here the engine is running in reverse and the valve element has been turned in the opposite direction, i. e., to the left. The port 72 however, still has both of its edges 72a and 72b within the inner edges 62b and 63a of the respective ports 62 and 63, so that the supply of high pressure air is cut off in the same manner as described with reference to reverse lever position B. The exhaust port 60 in this instance is closed by the solid portion of the valve element and the exhaust port 59 is in communication with the cavity 71 and is closed thereby. Hence, while there is no further supply of high pressure air to the forward end of the cylinder, the air from said end of the cylinder is not permitted to exhaust and the piston will be held in the same extreme rearward position, with the position of the fulcrum roller and the distribution of weight on the wheels of the locomotive remaining the same.

It will be apparent that if the reverse lever, is moved slightly further to the right it will be in position for exhausting the high pressure air from the forward end of the cylinder thereby effecting the movement of the piston to the forward end of the cylinder, and the movement of the fulcrum roller to the forward end of the lever 11, thus effecting a distribution of weight on the wheels of the locomotive for reverse movement corresponding to that for reverse lever position C for forward movement.

It will thus be seen that with the instant invention applied to a locomotive the adhesive weight is increased for the starting (during long cut-off) to take care of the required additional starting tractive adhesion, and the adhesive weight is reduced to normal for running at normal higher speeds with the cut-off shortened. This is accomplished by the changing of the position of the fulcrum of the equalizing lever 11. When the fulcrum is at the forward end of the lever the weight of the locomotive is distributed normally between the driving wheels and the wheels of the trucks, and when the fulcrum is at the rear end of the lever the weight is substantially increased on the driving wheels and decreased on the truck wheels.

In locomotives where boosters are applied, the booster trailing truck wheels supply the required additional starting tractive power. It is a well understood fact that steam used in the main cylinders of locomotives is much more efficient than steam used in a booster. Further, a booster adds additional weight to the locomotive, which weight is saved by the instant invention, permitting a much lighter construction than that of the booster locomotive. Advantageous use may be made of this weight in increasing the size of the locomotive.

Figure 32:
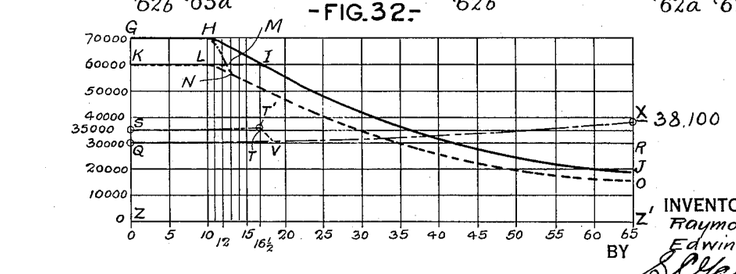
Fig. 32, a chart illustrating the tractive power and dynamic augment curves of a locomotive embodying, and a locomotive not embodying the instant invention.

For the purpose of comparative illustration there is shown in Fig. 32 tractive power curves for three different types of locomotives, each having eight drive wheels, namely locomotive I, II and III. Locomotive I will be presumed to be a long cut-off locomotive with the instant invention applied thereto, and its tractive power curve is indicated at G, H, I, J. The curve for an ordinary short cut-off locomotive II, without the present invention applied thereto (operating with the same piston thrust as locomotive I) is indicated by the line K, L, M, I, J. The curve for an ordinary long cut-off locomotive III (operating with a lower piston thrust than the locomotives I and II) is indicated at K, L, N, O.

The locomotives II and III have each a tractive power of 60,000 pounds. Each of these two locomotives is equipped with a booster giving an additional tractive power of 10,000. The figures to the left of the chart indicate the tractive power. Thus the booster equipped locomotive II starting tractive power is shown by the curve G, H, I, and the starting tractive power of booster equipped locomotive III is indicated by the curve G, H, M, N, the combined total starting tractive power of each of the locomotives II and III being brought up to 70,000 pounds by its booster.

The horizontal row of figures at the bottom of the chart indicates the speed of the engine in miles per hour at various points with relation to the cut-off and the cutting in and out of the boosters. The boosters are cut out when the locomotives have attained a speed of approximately 12 miles per hour.

In each of the locomotives II and III there is provided constant weight on the drivers of 240,000 pounds. The locomotive I of the instant invention has a normal tractive power of 60,000 pounds, which by virtue of the shifting of the fulcrum is increased when the engine is starting at long cut-off to 70,000 pounds, making a total weight on the driving wheels of 240,000 pounds normally, and a total weight of 280,000 pounds when the fulcrum has been shifted as aforesaid.

It will be apparent that in the instant invention the weight on the driving wheels is increased during the time when the counterbalance blow or dynamic augment is practically nil, that is from the moment of starting up to a point where the locomotive attains a speed of approximately 16½ miles per hour, this point being indicated on the chart for the instant locomotive at I. It will be understood that in this comparison there is taken a short cut-off locomotive with a booster (locomotive II), against a long cut-off locomotive with the instant invention applied thereto (locomotive I), both locomotives having cylinders of the same size and having the same piston thrust.

The combined weight on the rail for the instant locomotive which includes the increased static weight on the drivers plus the counterbalance dynamic augment at slow speeds up to approximately 16½ miles per hour, which is a point where the weight on the drivers has been reduced, is no higher than the normal weight of the second locomotive with a constant static weight on the drivers plus the counterbalance dynamic augment at high speeds. The curves of the combined static weight plus the dynamic augment are shown on a basis of each driving wheel for the locomotives.

For locomotive II, having a constant weight of 240,000 pounds, the weight per driving wheel will be 30,000 pounds as indicated by the line Q, R. On locomotive I with the instant invention applied thereto, the static weight per wheel will be 35,000 pounds from the time of starting up to reaching a speed of approximately 16½ miles per hour, as indicated on the line S, T. Since both locomotives have the same size cylinders and the weight of their reciprocating parts is the same, the same amount of reciprocating balance in the drive wheels, and consequently the same blow or dynamic augment on the rail will be effected for each locomotive. It is common in locomotives of the type of that of the instant invention to provide approximately 200 pounds of additional balance weight in each wheel as balance for the reciprocating parts. Assuming each locomotive to have a 32 inch stroke with 73 inch drivers, the dynamic augment will, at the starting point, be zero, and will increase as the square of the speed so that when the locomotives have attained a speed of 65 miles per hour, the dynamic augment will equal 8,100 pounds. This is represented for locomotive II, by the curve Q, V, X having its base line at Q, R and the same curve having its base line at Z, Z', represents the combined weight on the rail or static weight plus dynamic augment, which, as indicated, varies from 30,000 pounds from the start to 38,100 pounds when the locomotive has reached a speed of 65 miles per hour.

Using the same base line for locomotive I, with the instant invention applied thereto, the combined static weight plus the dynamic augment is represented by the curve S, T', V, X. It will thus be noted that in this instance the combined weight varies from 35,000 pounds at the starting point S and raises to 35,525 pounds at T', and then drops to 30,525 pounds at V, at which speed the tractive increasing device, having been adjusted to normal position, has decreased the weight on the driver to that of the ordinary locomotive and from this point on to the maximum speed, the static weight plus the dynamic augment curve is the same for both locomotives. It is therefore apparent that the combined static weight plus dynamic augment of 35,500 pounds is reached by locomotive II when it reaches a speed of approximately 53½ miles per hour, that is to say, the rail weight of locomotive I, of the instant invention, during the starting period is also reached by the ordinary locomotive as soon as the latter has reached a speed of 53½ miles per hour.

Figure 35:
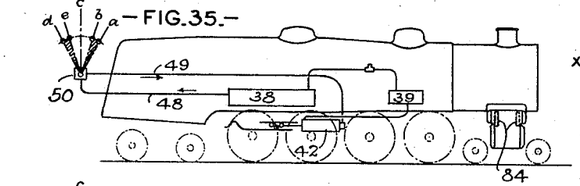
Figure 36:
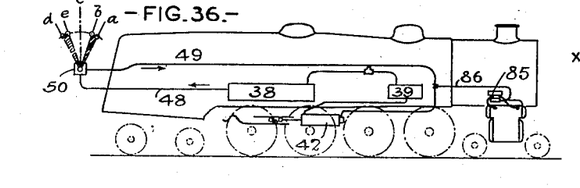
Figure 37:
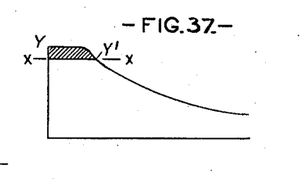
Figs. 37 to 40 inclusive, charts illustrating the variations in the tractive power with relation to the variations in steam distribution to the cylinders of the respective locomotives of Figs. 33 to 36 respectively.

In Figs. 33 to 36 there are diagrammatically illustrated four different locomotives with the instant invention applied thereto, and in Figs. 37 to 40 are shown power curves for each of these locomotives, respectively. At the left of Figs. 33 to 36 there are shown various lever positions, to wit, $a$, $b$, $c$, $d$ and $e$. In Fig. 37 the tractive power curve on which the normal tractive power is limited due to adhesive weight, is shown by the line $x$—$x$. Increase in tractive power above the normal, i. e., the line $x$—$x$, requires the traction increaser to be in operation, and is indicated by the line $y$—$y'$. The area between the normal tractive power line $x$—$x$ and the tractive power line $y$—$y'$, which is effected by the mechanism of the instant invention, is cross-sectioned, and in Fig. 33 the areas between the lever positions $a$—$b$ and $d$—$e$ are similarly cross-sectioned, thus indicating that the traction increaser is in operation between these lever positions. This particular engine is a long cut-off type, i. e., equipped with the valve gear which can give a 90% cut-off, and the traction increaser of the instant invention will be in operation for all of the cut-off positions between 90% and 55% (positions $a$—$b$ and $d$—$e$), and will be out of operation for cut-off positions of less than 55%. The detailed description hereinbefore set forth with particular reference to Figs. 20 to 31 inclusive, describes the present invention on the basis of the arrangement illustrated by Figs. 33 and 37.

Figure 33:
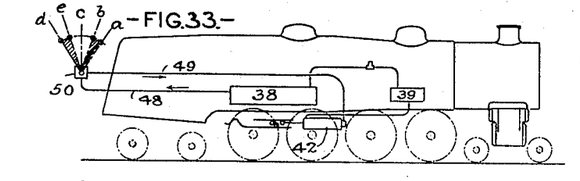
Figs. 33 to 36 inclusive, diagrammatic views of locomotives with the present invention applied thereto, Fig. 33 showing a long cut-off locomotive, Fig. 34 showing a short cut-off locomotive, Fig. 35 showing a short cut-off locomotive with starting ports in the cylinders, and Fig. 36 showing a short cut-off locomotive with air operated starting valves.
Figure 34:
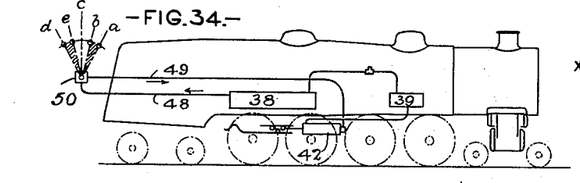
Figure 38:
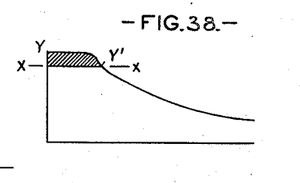
Figure 39:
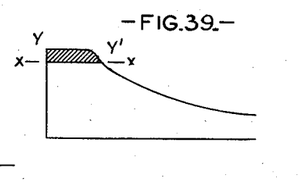

In Figs. 34 and 38 there is illustrated an application of the invention similar to that illustrated by Figs. 33 and 37 except that in Fig. 34 the locomotive is of the short cut-off type. Fig. 38 illustrates the tractive power curves for this locomotive in the same manner as Fig. 37 illustrates the curves for the locomotive of Fig. 33. It will be apparent that the short cut-off locomotive is equipped so as to give a cut-off of 60%, and the traction increaser will be in operation for all the cut-off positions between 60% and 33% (positions $a$—$b$ and $d$—$e$) as indicated by the cross-sectioned areas on Fig. 34, and the traction increaser will be out of operation for cut-off of less than 33%. Similar to Fig. 37, like lines $x$—$x$ and $y$—$y'$ and the cross sectional area are shown in Fig. 38.

In Fig. 35 there is shown the traction increaser of the instant invention applied to a short cut-off locomotive which is equipped with fixed auxiliary starting ports 84 in the cylinders. This locomotive is arranged with a valve gear, giving a maximum cut-off of 60% and the starting ports are adapted to feed the necessary steam to the cylinder for the remainder of the stroke, thus giving the increased power above the line $x$—$x$, Fig. 39, and the traction increaser is in operation for a relatively small proportion of the cut-off positions, i. e., from the positions $a$ to $b$ and $d$ to $e$, as shown in cross section on the drawings, or from 60% to 55% cut-off. As is well understood in practice, these starting ports are comparatively small and can only feed sufficient steam when the locomotive is moving slowly although the same leak steam during every stroke regardless of the speed of the locomotive.

Figure 40:
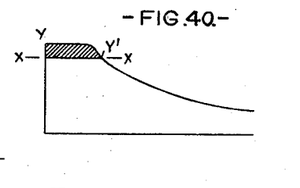
Figure 41:
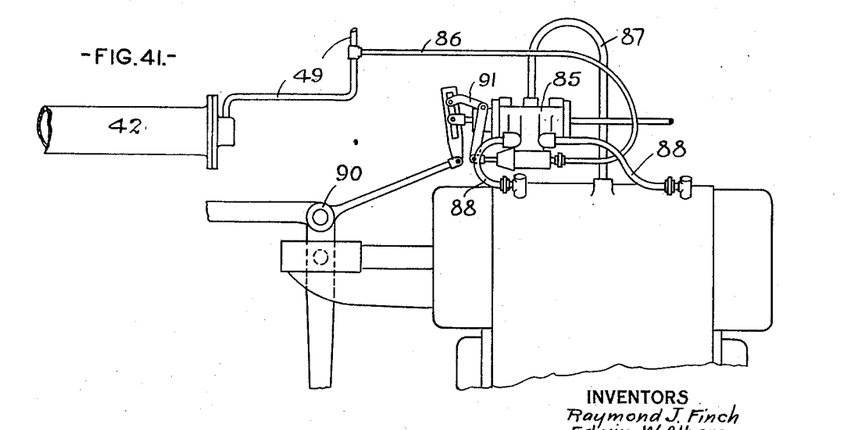
Fig. 41, an enlarged elevation of the starting valve arrangement of the locomotive of Fig. 36.

Referring to Figs. 36 and 40, there is here illustrated a short cut-off locomotive with the traction increaser of the instant invention applied thereto, and the tractive power curves therefor, this locomotive being equipped with a pneumatically operated starting valve 85. The starting valve is of a type now in use and is illustrated in Fig. 41. The valve 85 is applied to the locomotive cylinder in the usual manner well known in the art, and the same air that feeds the traction increased cylinder through the pipe 49 (Fig. 1) is supplied to the valve 85 from said pipe 49 through an extension 86. The pipe 87 connects the valve with the steam chest and the pipes 88 connect the starting valve with peep-holes in the cylinders. The valve 85 is connected to the combination lever and radius rod indicated generally by the numeral 90, by suitable levers indicated generally by the numeral 91, in the usual manner. As well understood, this starting valve differs from the fixed starting port arrangement of the locomotive illustrated in Fig. 35, in that the lengthened period of steam admission beyond the maximum permitted by the valve gear is controlled by the air operated means and feeds additional steam only when desired, usually during the starting period. The present invention synchronizes this type of starting device with the traction increaser so that air which feeds the traction increaser cylinder 42, at the same time feeds air to and operates the starting valve 85, as aforesaid through the extension pipe 86.

It will be noted that the embodiments of the invention illustrated in Figs. 35 and 36 involve a modified principle by which the tractive power is increased, from the principle involved in the embodiments illustrated in Figs. 33 and 34. In the latter two arrangements (Figs. 33 and 34), the increased tractive power, as indicated by that portion of the tractive power curve above the line x—x, i. e. by the line y—y', is directly due to a change to long cut-off and simultaneous increased weight on the driving wheels. On the other hand, in the arrangements of Figs. 35 and 36, the cut-off or steam distribution of the main valve and valve gear is purposely limited to approximately 60% (cut-off when the weight on the driving wheels is increased), and the cylinders are proportioned to give a normal tractive power corresponding to that portion of the tractive power curve indicated by the lines x—x, Figs. 39 and 40, and any increase in tractive power as indicated by the lines y—y' above the lines x—x, is effected by change to relatively long cut-off and simultaneous increased weight on the driving wheels, at which time the lengthened period of admission of steam to the cylinders is effective, in the embodiment of Fig. 35 through the starting ports 84 and in the embodiment of Fig. 36 through the air operated starting valve 85.

It will be understood that the control valve mechanism 50 can readily be adjusted to function between various cut-offs as desired, for the various arrangements illustrated in Figs. 33 to 36, by changing the portage in the operating valve seat, and the amount of lap of port 72 and the cavities 71 and 73 to correspond with the portage in the valve seat.

Figure 42:
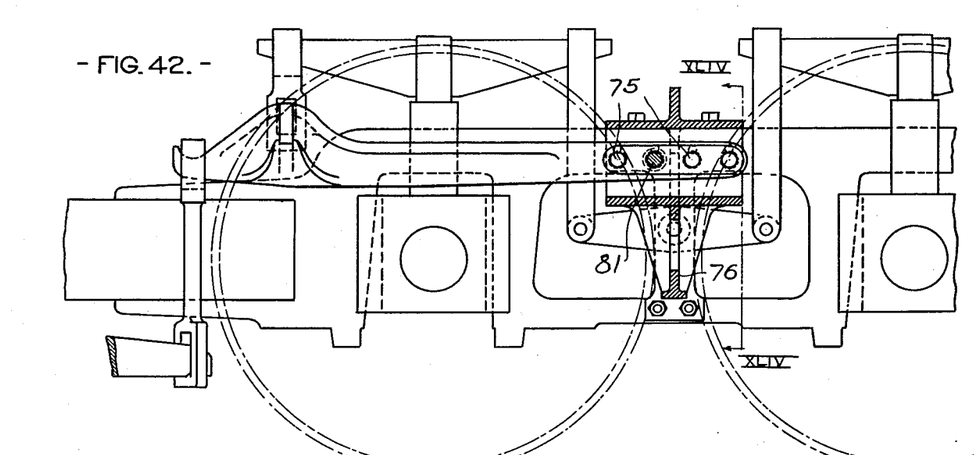
Fig. 42, an enlarged side view of a portion of a locomotive embodying a modified form of adjustable equalizer fulcrum mechanism, partly in section on the line XLII—XLII of Fig. 44.
Figure 43:
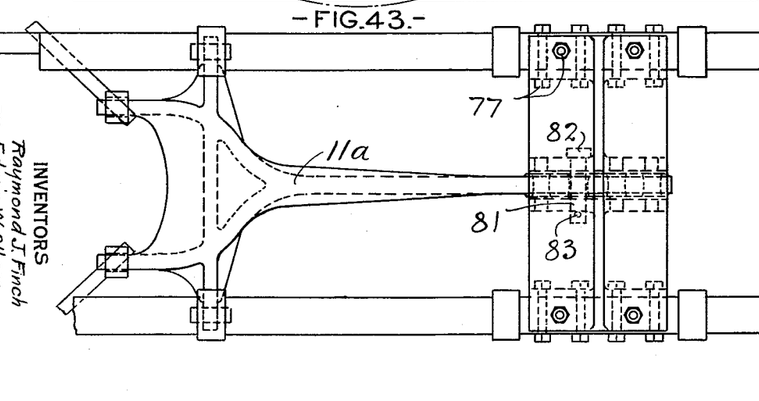
Fig. 43, a plan view of the portion shown in Fig. 42.
Figure 44:
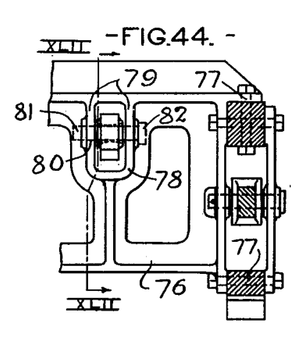
Fig. 44, a fragmental section on the line XLIV—XLIV of Fig. 42.

In Figs. 42 to 44 inclusive, there is illustrated a modified form of adjustable equalizer mechanism. The equalizer lever 11a is of substantially the same construction as the equalizer 11 of the preferred embodiment of the invention, with certain distinguishing characteristics hereinafter described. It comprises a straight longitudinal portion, and arms and lateral extensions which are connected to the sets of spring rigging of the truck and drive wheels in the same manner described with reference to the lever 11. In this instance, however, the longitudinal portion is not provided with a bearing plate, and the forward end of the same is provided with a plurality of spaced orifices 75. A crosstie member 76 is suitably secured to the side frame members of the locomotive by bolts 77 and is provided at its central portion with an integrally formed housing 78 through which the forward end of the lever 11a passes.

In the sides 79 of the housing 78, a plurality of spaced orifices 80 are formed, said orifices being in alignment with the orifices in the forward end of the lever 11a. A pin 81 is adapted to be passed through one of the groups of aligned orifices in the housing and the end of the lever. The pin is provided with a head 82 and a key 83 adapted to hold the same in position. The orifices 75 are balled out and the housing 78 is of sufficient width to leave a clearance on each side of the lever so as to permit the lever to roll laterally when the locomotive is in operation. It will be apparent that by adjusting the pin, that is, placing it through one or the other of the aligned groups of orifices either nearer to or further from the end of the lever, the fulcrum may be shifted as desired, thus varying the distribution of weight between the driving wheels and the truck wheels as desired. In this embodiment of the invention the adjustment is of a permanent nature, that is to say, the variance of the distribution of weight between the drive wheels and truck wheels of the locomotive is effected while the same is not in operation, and is not variable while the locomotive is running.

Quite frequently it is necessary to change the equalization to increase or decrease the weight on drivers about 4,000 pounds or 5,000 pounds, and therefore this method of equalization between the drive wheels and trailer truck wheels (especially on modern locomotives which have trailing trucks with four or more wheels) is a particular improvement in that the adjustment is made at the end of the lever, and the usual spacing of about 4" for the adjusting holes can be maintained. The leverage in this case is such that a change of 4" in the pin location will effect an increase or decrease of about 4,000 pounds or 5,000 pounds in the weight on the drive wheels.

It is a well known fact that in ordinary practice the fulcrum pins 7a in the front trailer equalizers 7, (Figure 1), are usually shifted to effect a change in distribution of the weight between the drive and truck wheels. The fulcrum pins 7a in this case, however, support much greater loads, and in order to obtain a variation of 4,000 pounds or 5,000 pounds in distribution of the weight on the drive wheels this fulcrum pin requires a change of only about ½", and while it is not practical to space the adjusting holes so close together, the usual arrangement embodying reversible bushings with offset pin holes is used. In case a change in weight distribution is desired, these reversible bushings must be removed from the trailing truck frame and the equalizers 7, and involves considerable expense and usually necessitates the removal of the whole trailing truck from the locomotive.

The improved construction of the present invention (Figs. 42 to 44) affords a simple sturdy mechanism which is economical in cost, efficient in operation, and in case a change in weight distribution is desired it necessitates the changing of only one pin. Further, it does not require the removal of the trailing truck, is easily accessible, and eliminates the necessity of changing a multiple number of parts as in ordinary practice.

While there have been hereinbefore described certain approved embodiments of the present invention, it will be apparent to those skilled in the art that many and various changes and modifications in form, procedure and structure may be made without departing from the spirit of the invention, and it will be understood that all such changes and modifications as fall within the scope of the appended claims are contemplated as a part of the present invention.

The invention claimed and desired to be secured by Letters Patent is:

1. A locomotive comprising an equalizer lever free at one end; and an adjustable fulcrum member for said lever adapted for movement away from and toward said free end to effect a variance in the distribution of weight on the locomotive wheels.

2. A locomotive comprising weight bearing driving wheels; weight bearing truck wheels; spring rigging for said driving wheels; spring rigging for said truck wheels; an equalizer lever free at one end operably connected with said spring riggings; and an adjustable fulcrum member for said lever, adapted for movement away from and toward said free end to effect a variance in the distribution of weight between said driving wheels and said truck wheels.

3. A locomotive comprising a five-point equalizer lever mechanism, the lever of said mechanism having a free end and one of said points being adapted for movement away from and toward said free end to effect a variance in the distribution of weight on the locomotive wheels.

4. A locomotive comprising driving wheels; truck wheels; sets of spring rigging disposed on opposite sides of said locomotive for said driving wheels and said truck wheels; a five-point equalizer lever having a free end; and an adjustable fulcrum member for said lever, said lever being connected at two of its points to the oppositely disposed sets of spring rigging for said truck wheels, and connected at two other of its points to the oppositely disposed sets of spring rigging of said driving wheels, the fifth said point being operably engaged with said adjustable fulcrum member, said fulcrum member being adapted for movement away from and toward said free end to vary the position of said fifth point to effect a variance in the distribution of weight between said driving wheels and said truck wheels.

5. In a locomotive, a five-point equalizer mechanism having one of its points adjustable to a position relatively close to the other four points to effect a distribution of weight on the wheels of said locomotive wherein the weight on the driving wheels is of a relatively increased amount, and adjustable to a position relatively remote from the other four points wherein the weight on said driving wheels is of a relatively decreased amount.

6. An equalizer lever for a locomotive, comprising a member adapted to extend longitudinally of said locomotive; and means disposed at one end of said member transversely thereof adapted for connection with sets of spring rigging on opposite sides of said locomotive, said member being adapted to operably engage a movable fulcrum member.

7. An equalizer lever for a locomotive, comprising a member adapted to extend longitudinally of said locomotive, having a free end; means disposed at the end of said member opposite said free end adapted for connection with a plurality of spring riggings; and means formed on the upper side of said member providing a bearing surface for a movable fulcrum member between said ends.

8. A locomotive comprising weight bearing driving wheels; weight bearing truck wheels; a set of spring rigging for the driving wheels on one side of said locomotive; a set of spring rigging for the driving wheels on the opposite side of said locomotive; a set of spring rigging for the truck wheels on one side of said locomotive; a set of spring rigging for the truck wheels on the opposite side of said locomotive; an equalizer lever connected with each of said sets of spring rigging; an adjustable fulcrum device for said lever adapted upon adjustment to vary the distribution of weight between said driving wheels and said truck wheels; a distribution valve adapted for variable cut-off; a reverse gear adapted to control the degree of cut-off; an operating lever connected with said reverse gear; and means operably connecting said fulcrum device with said operating lever whereby weight distributed to said driving wheels will be increased when said distribution valve is positioned for long cut-off and weight distributed to said driving wheels will be decreased when said distribution valve is positioned for short cut-off.

9. A locomotive comprising weight bearing driving wheels; weight bearing truck wheels; a set of spring rigging for the driving wheels on one side of said locomotive; a set of spring rigging for the driving wheels on the opposite side of said locomotive; a set of spring rigging for the truck wheels on one side of said locomotive; a set of spring rigging for the truck wheels on the opposite side of said locomotive; an equalizer lever connected to each of said sets of spring rigging; and an adjustable fulcrum member for said lever adapted upon adjustment to effect a variance in the distribution of weight between said driving wheels and said truck wheels.

10. A locomotive comprising driving wheels; truck wheels; sets of spring rigging disposed on opposite sides of said locomotive for said driving wheels and said truck wheels; a five-point equalizer lever; and an adjustable fulcrum member for said lever, said lever being connected at two of its points to the oppositely disposed sets of spring rigging for said truck wheels, and connected at two other of its points to the oppositely disposed sets of spring rigging for said driving wheels, the fifth said point being operably engaged with said adjustable fulcrum member, and said fulcrum member being adjustable to move said fifth point in the direction of the other four points to effect an increase in the proportionate weight of said locomotive distributed to said driving wheels and being adjustable to move said fifth point away from said other four points to effect a decrease in the proportionate weight of said locomotive distributed to said driving wheels.

11. An equalizer lever for a locomotive, comprising a member adapted to extend longitudinally of said locomotive; and means disposed at one end of said member transversely thereof adapted for connection with sets of truck wheel spring rigging on opposite sides of said locomotive and sets of driving wheel spring rigging on opposite sides of said locomotive.

12. An equalizer lever for a locomotive, comprising an integral casting having a member adapted to extend longitudinally of said locomotive, T-shaped in cross-section; a pair of arm members diverging from one end of said T-shaped member; and a pair of outwardly extending arm members adjacent said first pair of arm members, said arm members being adapted for connection with sets of spring rigging disposed on opposite sides of said locomotive.

13. A locomotive comprising a plurality of weight bearing driving wheels; a plurality of weight bearing truck wheels; a set of spring rigging for the driving wheels on one side of said locomotive; a set of spring rigging for the driving wheels on the opposite side of said locomotive; a set of spring rigging for the truck wheels on one side of said locomotive; a set of spring rigging for the truck wheels on the opposite side of said locomotive; an equalizer lever connected with each of said sets of spring rigging; an adjustable fulcrum device for said lever adapted upon adjustment to vary the distribution of weight between said driving wheels and said truck wheels; a plurality of steam distribution valves adapted for variable cut-off means including a reverse lever for controlling the degrees of said cut-off and for controlling both forward and reverse movements of said locomotive; and means operably connected with said reverse lever and said fulcrum device whereby the amount of weight distributed to said driving wheels with relation to said truck wheels will be increased and decreased respectively for long and normal cut-off positions of said reverse lever when said reverse lever is adjusted for either forward or reverse movement of said locomotive.

14. A locomotive comprising weight bearing driving wheels; weight bearing truck wheels; a set of spring rigging for the driving wheels on one side of said locomotive; a set of spring rigging for the driving wheels on the opposite side of said locomotive; a set of spring rigging for the truck wheels on one side of said locomotive; a set of spring rigging for the truck wheels on the opposite side of said locomotive; an equalizer lever connected to each of said sets of spring rigging; an adjustable fulcrum member for said lever adapted upon adjustment to vary the distribution of weight between said driving wheels and said truck wheels; motor means operably connected to said fulcrum member to actuate the same; steam distribution valve mechanism adapted for adjustment to long and short cut-off positions; a reverse gear mechanism for controlling said adjustment; and means operably connected to said reverse gear mechanism and said motor means for simultaneously controlling the operation of said reverse gear mechanism and said motor means whereby a variance in the distribution of weight between said driving wheels and said truck wheels will be effected upon change from either of said cut-off positions to the other.

15. A locomotive comprising a power cylinder; a valve gear for controlling the introduction of steam to said cylinder; an auxiliary valve for effecting the introduction of steam into said cylinder; means for varying the distribution of weight on the wheels of said locomotive; and means operably connecting said auxiliary valve and said weight distribution varying means for simultaneously controlling said auxiliary valve and varying means whereby weight on the locomotive driving wheels will be increased during periods when the introduction of steam into said cylinder is being effected by said auxiliary valve.

16. In a locomotive, means for distributing the weight of the wheels of said locomotive including a lever; and an adjustable fulcrum device for said lever comprising a housing, means disposed within said housing movably engaging said lever, and a yoke secured to said housing loosely surrounding said lever.

17. In a locomotive, means for distributing the weight to the wheels of said locomotive including a lever; and an adjustable fulcrum device for said lever comprising a housing, means disposed within said housing movably engaging said lever, and slidable guiding means disposed on the outside of said housing.

18. In a locomotive, means for distributing the weight to the wheels of said locomotive including a lever; and an adjustable fulcrum device for said lever, comprising a housing, rotatable bearing means within said housing engaging said lever, and rollers disposed on opposite sides of said housing providing vertical bearing means for said device.

19. In a locomotive, means for distributing the weight to the wheels of said locomotive including a lever having a convex bearing surface longitudinal of said locomotive; and an adjustable fulcrum device for said lever, comprising a housing, and a roller rotatably secured in said housing and having a concave bearing face engaging said convex bearing surface of said lever.

20. In a locomotive, means for distributing the weight to the wheels of said locomotive including a lever; and an adjustable fulcrum device for said lever comprising a housing, bearing means disposed within said housing movably engaging said lever, rollers rotatably secured on opposite sides of said housing providing vertical bearing means for said device, and shoes mounted on opposite sides of said housing extending outwardly beyond said rollers providing lateral guiding means for said device.

21. In a locomotive, means for distributing the weight to the wheels of said locomotive including a lever, an adjustable fulcrum device for said lever comprising a longitudinally movable housing, means disposed within said housing engaging said lever, and lateral bearing means disposed on opposite sides of said housing; and a guide member extending longitudinally of said lever comprising a top wall providing a bearing surface on its lower side for said device, and longitudinal side walls providing bearing surfaces on their inner sides for said lateral bearing means.

RAYMOND J. FINCH.
EDWIN W. ALBERS.